March 18, 1969 HOZUMI HIROTA 3,433,630

MAGNETIC PERMEABILITY MATERIAL

Filed Oct. 13, 1966

INVENTOR
HOZUMI HIROTA

BY Wenderoth, Lind & Ponack

ATTORNEYS

United States Patent Office 3,433,630
Patented Mar. 18, 1969

3,433,630

MAGNETIC PERMEABILITY MATERIAL

Hozumi Hirota, Osaka-fu, Japan, assignor to Matsushita Electric Industrial Co., Ltd., Osaka, Japan Filed Oct. 13, 1966, Ser. No. 586,402
Claims priority, application Japan, Oct. 15, 1965, 40/63,606
U.S. Cl. 75—170 6 Claims
Int. Cl. C22c 5/00; H01f 1/04

This invention relates to new ferromagnetic material and more particularly to ferromagnetic material characterized by high mechanical hardness, high permeability, and impressive saturation magnetization.

The per se well known soft magnetic material in an oxide form usually comprises ferrite consisting of iron oxide, divalent metal oxides and other additive oxides. Famous iron alloys known as soft ferromagnetic materials are alloys of iron-nickel, iron-aluminium, and iron-aluminium-silicon which are commercially available as "Permalloy," "Alperm," and "Sendust," respectively. The said soft magnetic materials are not entirely satisfactory from the standpoint of mechanical hardness. Recent development in the electronic industry has required a soft magnetic material having high mechanical hardness. Such material is especially desirable for use in the head chip of a video tape recorder. For practical application, such soft magnetic material is also required to have a high Curie temperature. A Curie temperature below room temperature (about 20 to 30° C.) greatly restricts practical application.

It is an object of this invention to provide magnetic material having high mechanical hardness, high magnetic permeability, a high Curie temperature and impressive saturation magnetization.

Figure 1:
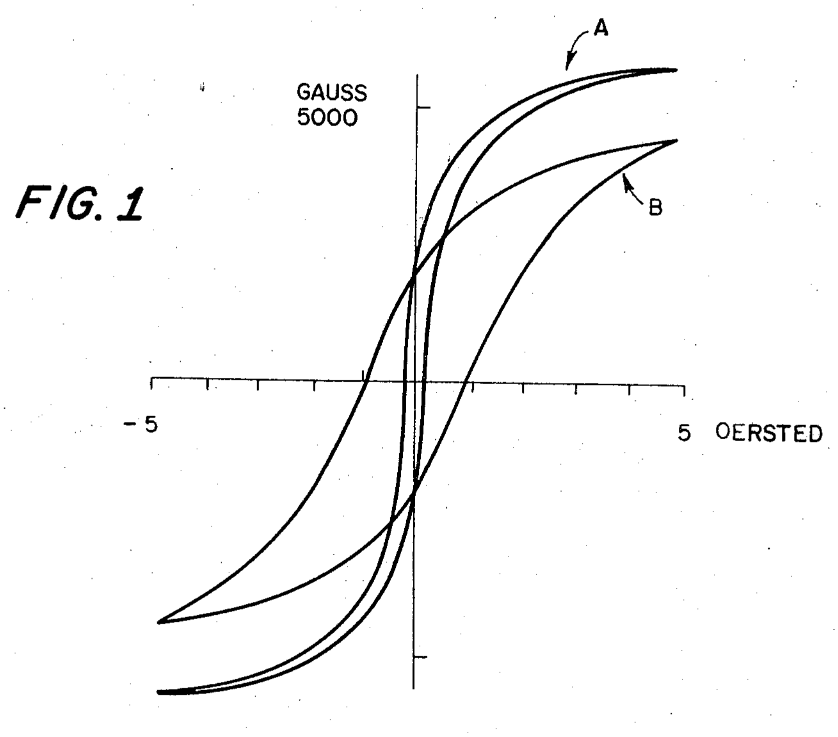
Figure 2:
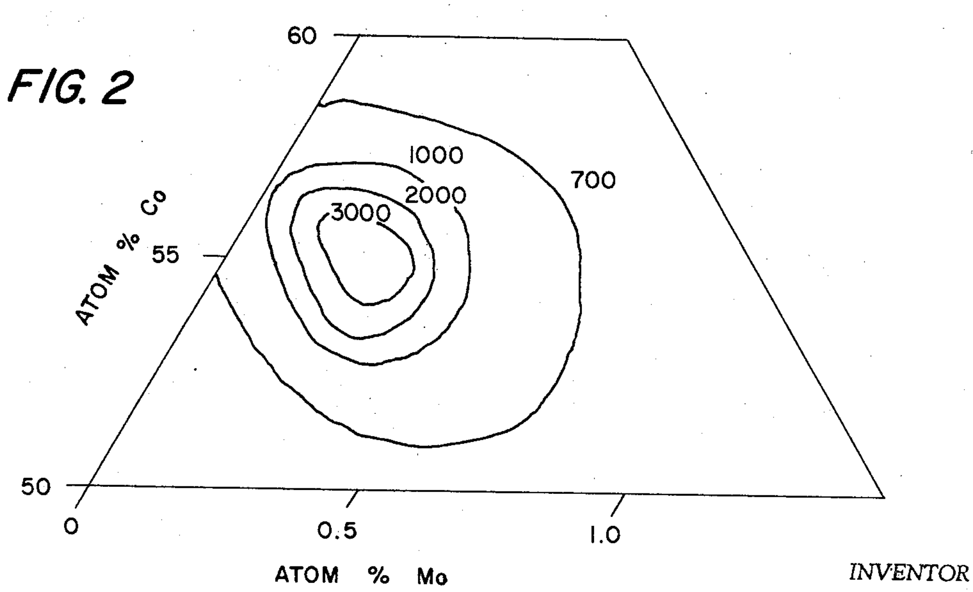

More details of this invention will become apparent upon consideration of the following description taken together with accompanying drawings in which:

FIG. 1 is a graph illustrating static hysteresis loop of a typical composition according to the invention (curve A), in comparison with a curve B of materials having no Mo additives, and, FIG. 2 is a graph illustrating contour lines of effective permeability, of the novel compositions of this invention, said permeability being measured at a frequency of 100 c./s. (cycles per second).

The present invention is based on the finding that the material defined by the chemical formula $$Co_{20-x}Fe_xAl_3B_6$$

is a ferromagnetic crystal having a $Cr_{23}C_6$ type of structure and has high magnetic permeability at about $x=4$. According to the present invention, $Co_{20-x}Fe_xAl_3B_6$ can form a new composition $$Co_{20-x-y}Fe_xMo_yAl_3B_6$$

by a partial replacement of Co by Fe and Mo while maintaining the original cubic structure. The thus obtained material $Co_{20-x-y}Fe_xMo_yAl_3B_6$ has a face-centered-cubic structure belonging to space group $O_h^5$ F*m*3*m*, i.e. a $Cr_{23}C_6$ type of structure.

The atom arrangement of the crystal of $Co_{20}Al_3B_6$ is as follows:

Cobalt atoms occupy point positions "*f*" and "*h*" of F*m*3*m*, aluminium atoms occupy point positions "*a*" and "*c*" of F*m*3*m* and boron atoms occupy point position "*e*" of F*m*3*m* (Stadelmaier et al. Metall, 1962, vol. 16, pp. 773 and 1229).

The new material $Co_{20-x-y}Fe_xMo_yAl_3B_6$ according to the invention is a single phase of the $Cr_{23}C_6$ type of structure when $(x+y)$ is lower than about 10. When the substituted amount $(x+y)$ is higher than 10, the obtained material results in two phases of a $Cr_{23}C_6$ type and another phase. The coexistence of another phase impairs the magnetic permeability of the novel compositions.

Examination of FIG. 1 which shows magnetic hysteresis loop of $Co_{15.72}Fe_{4.20}Mo_{0.08}Al_3B_6$ (curve A) taken together with that of $Co_{15.8}Fe_{4.2}Al_3B_6$ (curve B), reveals that the addition of small amounts of Mo quite reduces the coercive force and increases the permeability. This reduction of coercive force is probably due to the reduction of magneto-striction in this phase.

The effective permeability of the composition $$Co_{20-x-y}Fe_xMo_yAl_3B_6$$

is plotted as a function of atomic percent of Co and Mo while atomic percent of Al and B are fixed at constant values of 10.35 atomic percent and 20.7 atomic percent, respectively and atomic percent of Fe is the remainder. Samples for measurement are prepared by melting in a manner described hereinafter. The effective permeability is measured at a frequency of 100 c./s. in a per se well known method and is shown in FIG. 2 and Table 1. FIG. 2 shows contour lines of effective permeability of the reduced Co-Fe-Mo ternary system of this invention. It will be obvious from FIG. 2 that the preferable compositions for high permeability are those between $x=2.9$ to $x=5.2$ and $y=0.005$ to $y=0.30$. The Vickers' hardness of the novel compositions is measured by a per se usual method. The hardness of the novel material, 1100, is much greater than that of the conventional soft magnetic materials, Permalloy, Alperm and Sendust, i.e. ca. 500 or less. The novel composition, $Co_{20-x-y}Fe_xMo_yAl_3B_6$ has a Curie temperature ranging from 260° to 400° C. and a saturation magnetization ranging from 63 to 86 e.m.u./g., when the $x$ is 2.9 to 5.2 and the $y$ is 0.005 to 0.30.

TABLE 1

| Sample No. | Co (at percent) | Mo (at percent) | Fe (at percent) | Effective permeability |
|---|---|---|---|---|
| 1 | 51.3 | 0.69 | 16.96 | 690 |
| 2 | 52.0 | 0.30 | 16.65 | 710 |
| 3 | 56.2 | 0.60 | 12.15 | 690 |
| 4 | 58.6 | 0.10 | 10.25 | 720 |
| 5 | 53.4 | 0.31 | 15.24 | 1,030 |
| 6 | 54.5 | 0.48 | 13.97 | 930 |
| 7 | 56.6 | 0.35 | 12.00 | 913 |
| 8 | 57.0 | 0.04 | 11.91 | 2,120 |
| 9 | 55.0 | 0.14 | 13.81 | 2,180 |
| 10 | 53.8 | 0.38 | 14.77 | 2,340 |
| 11 | 55.4 | 0.38 | 13.17 | 2,270 |
| 12 | 56.7 | 0.18 | 12.07 | 1,890 |
| 13 | 54.3 | 0.28 | 14.37 | 3,200 |
| 14 | 54.8 | 0.34 | 13.81 | 2,930 |
| 15 | 55.4 | 0.18 | 13.37 | 3,420 |

The new material $Co_{20-x-y}Fe_xMo_yAl_3B_6$ exists in a $Cr_{23}C_6$ type structure and does not suffer impairment of the magnetic properties even when the amounts of aluminium atoms and/or boron atoms deviate slightly from stoichiometric proportions. A large deviation of both aluminium and boron atoms, however, results in impairment of magnetic properties. Suitable atomic percentages are 6.5 to 11.2 atomic percent of aluminium and 17.0 to 25.9 atomic percent of boron.

Under consideration of the results of FIG. 2 and of the effects of deviation of atomic percentages of boron and aluminium, the operable compositions are

| | Atomic percent |
|---|---|
| Cobalt | 51–59 |
| Molybdenum | 0.02–0.8 |
| Aluminium | 6.5–11.2 |
| Boron | 17.0–25.9 |
| Iron | Balance |

Preferable compositions are

| | Atomic percent |
|---|---|
| Cobalt | 53.0–57.5 |
| Molybdenum | 0.1–0.5 |
| Aluminium | 6.5–11.2 |
| Boron | 17.0–25.9 |
| Iron | Balance |

and still more preferable compositions in view of magnetic permeability are

| | Atomic percent |
|---|---|
| Cobalt | 54.0–56.0 |
| Molybdenum | 0.2–0.4 |
| Aluminium | 6.5–11.2 |
| Boron | 17.0–25.9 |
| Iron | Balance |

The novel material of this invention can be prepared by a per se well known metallurgy technique by using either the sintering method or the melting method. Starting materials are high purity cobalt, aluminium, boron, iron and molybdenum, all in granular form. Commercially available granules may be used. Lumps of each constituent, approximately 1/4 centimeter in size, are mixed in a desired proportion and are placed in an alumina crucible and heated in an argon atmosphere in an induction furnace to approximately 1600° C. The melt is then allowed to cool room temperature. The resulting ingot is a pentamerous compound in a single phase of the crystal structure referred to above. The melting point of the compound is approximately 1400–1500° C. No special cooling process is required for producing satisfactory magnetic properties. This is also a great feature of the novel material when compared with conventional magnetic material, such as Sendust or Permalloy, which requires a special cooling process. Either high or low rate of cooling produces similarly satisfactory magnetic properties in accordance with the present invention.

The sintering method can be performed as follows:

Intimate mixtures of the constituent powders are pressed into desired shape at a pressure higher than 500 kg./cm.$^2$ (kilograms per square centimeter). The higher pressure is preferable for obtaining higher density of pressed product. The pressed product is then sintered at 800° to 1000° C. for 1 to 200 hours in a reduced atmosphere (air) ranging from $10^{-2}$ to $10^{-6}$ mm. Hg or in a non-oxidizing atmosphere such as argon. Porosity of the sintered material can be controlled by adjusting pressing pressure, sintering temperature, sintering time or their combinations in a way similar to the per se well known powder metallurgy technique.

Measurement of magnetic permeability is made with a ring in a desired composition cut out from an ingot prepared by the method hereinbefore described. The ring, having a 14.5 mm. outer diameter, 5.0 mm. inner and about 2 mm. thickness, is provided with Litz wire at 50 turnings for the purpose of measuring magnetic permeability in the per se usual manner.

The new compositions of this invention are inter alia very well suitable for use in the head chip of a video tape recorder.

The following examples of specific new compositions are given by way of illustration and should not be construed as limitative.

Example 1

A mixture consisting of

| | Atomic percent |
|---|---|
| Cobalt | 54.58 |
| Iron | 14.58 |
| Molybdenum | 0.28 |
| Aluminium | 9.73 |
| Boron | 20.83 |

is melted by the method described above. Powder X-ray diffraction lines of the specimen are exactly indexed as a face-centered-cubic lattice of the $Cr_{23}C_6$ type. This specimen is in an atomic proportion indicated by the formula:

$$Co_{15.72}Fe_{4.20}Mo_{0.08}Al_{2.8}B_6$$

The composition is provided with an effective permeability of 3200 at 100 c./s., a Vickers' hardness of 1100, a Curie temperature of 352° C. and saturation magnetization of 78 e.m.u./g.

Example 2

As a further example, a specimen having the atomic proportion $$Co_{15.72}Fe_{4.20}Mo_{0.08}Al_3B_{6.7}$$

is obtained by melting a mixture consisting of

| | Atomic percent |
|---|---|
| Cobalt | 52.93 |
| Iron | 14.14 |
| Molybdenum | 0.27 |
| Aluminium | 10.10 |
| Boron | 22.56 |

in exactly the same way as that above described. This specimen clearly exists in a single phase of the $Cr_{23}C_6$ type, and the effective permeability is 3480 at 100 c./s.

Example 3

By way of further examples, samples of $$Co_{15.72}Fe_{4.20}Mo_{0.08}Al_{3.2}B_{6.4}$$

are prepared in exactly the same way as that hereinbefore described. It is thus found, that $$Co_{15.72}Fe_{4.20}Mo_{0.08}Al_{3.2}B_{6.4}$$

exhibits essentially the same magnetic properties as those of $Co_{15.72}Fe_{4.20}Mo_{0.08}Al_3B_6$.

What is claimed is:

1. A ferromagnetic material with a $Cr_{23}C_6$ type of crystal structure comprising essentially

| | Atomic percent |
|---|---|
| Cobalt | 51.0–59.0 |
| Molybdenum | 0.02–0.8 |
| Aluminium | 6.5–11.2 |
| Boron | 17.0–25.9 |
| Iron | Balance |

said crystal structure having such an atom arrangement that point positions "*f*" and "*h*" of F*m*3*m* are occupied by cobalt atoms, iron and molybdenum atoms, point positions "*a*" and "*c*" of F*m*3*m* are occupied by aluminium atoms, and point position "*e*" of F*m*3*m* is occupied by boron atoms.

2. A ferromagnetic composition as defined in claim 1 consisting essentially of:

| | Atomic percentage |
|---|---|
| Co | 53.0–57.5 |
| Mo | 0.1–0.5 |
| Al | 6.5–11.2 |
| B | 17.0–25.9 |
| Iron | Balance |

3. A ferromagnetic composition as defined in claim 1 consisting essentially of:

| | Atomic percentage |
|---|---|
| Co | 54.0–56.0 |
| Mo | 0.2–0.4 |
| Al | 6.5–11.2 |
| B | 17.0–25.9 |
| Iron | Balance |

4. A ferromagnetic composition according to claim 1, said composition according to the formula $$Co_{15.72}Fe_{4.20}Mo_{0.08}Al_{2.8}B_{6}$$

5. A ferromagnetic composition according to claim 1, said composition corresponding to the formula $$Co_{15.72}Fe_{4.20}Mo_{0.08}Al_{3}B_{6.7}$$

6. A ferromagnetic composition according to claim 1, said composition corresponding to the formula $$Co_{15.72}Fe_{4.20}Mo_{0.08}Al_{3.2}B_{6.4}$$

References Cited

UNITED STATES PATENTS

| | | | |
|---|---|---|---|
| 3,206,338 | 9/1965 | Miller et al. | 75—123X |
| 3,211,592 | 10/1965 | Masumoto et al. | 75—170 X |
| 3,403,996 | 10/1968 | Hirota et al. | 75—170 |
| 3,406,057 | 10/1968 | Hirota et al. | 75—170 X |

RICHARD O. DEAN, *Primary Examiner.*

U.S. Cl. X.R.

148—31.55